United States Patent
Addepalli

(10) Patent No.: US 10,303,671 B1
(45) Date of Patent: May 28, 2019

(54) APPARATUS, SYSTEM, AND METHOD FOR ACCELERATING BITMAP LOOKUPS IN NETWORK DEVICES

(71) Applicant: Juniper Networks, Inc., Sunnyvale, CA (US)

(72) Inventor: Meher Aditya Kumar Addepalli, Cupertino, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 281 days.

(21) Appl. No.: 15/283,258

(22) Filed: Sep. 30, 2016

(51) Int. Cl.
| | |
|---|---|
| *G06F 17/30* | (2006.01) |
| *G06F 16/22* | (2019.01) |
| *G06F 3/06* | (2006.01) |
| *G06F 16/2453* | (2019.01) |

(52) U.S. Cl.
CPC ........ *G06F 16/2237* (2019.01); *G06F 3/0604* (2013.01); *G06F 3/067* (2013.01); *G06F 3/0608* (2013.01); *G06F 3/0631* (2013.01); *G06F 16/2246* (2019.01); *G06F 16/2453* (2019.01)

(58) Field of Classification Search
CPC .... G06F 17/30; G06F 17/30324; G06F 17/00; G06F 17/30327; G06F 16/2237; G06F 16/2246; G06F 16/2453
USPC .................................................. 707/600–899
See application file for complete search history.

(56) References Cited

U.S. PATENT DOCUMENTS

| | | |
|---|---|---|
| 6,175,900 B1 | 1/2001 | Fori et al. |
| 2010/0049870 A1* | 2/2010 | Brown .................... H04L 45/00 709/242 |

* cited by examiner

*Primary Examiner* — Isaac M Woo
(74) *Attorney, Agent, or Firm* — FisherBroyles, LLP

(57) ABSTRACT

The disclosed apparatus may include a processing unit may manage memory in connection with a computing device by (1) searching a root index of a root node for a bit indicating that a specific lookup index within the root node corresponds to a leaf node that references an unallocated memory location, (2) identifying, within the specific lookup index, a bit indicating that a specific leaf node references the unallocated memory location, (3) searching a leaf index of the specific leaf node for a bit indicating that a specific object within the leaf node corresponds to the unallocated memory location, (4) identifying, within the specific object, a bit that corresponds to a specific memory location and indicates that the specific memory location is currently unallocated, and then (5) allocating the specific memory location for use by the computing device. Various other apparatuses, systems, and methods are also disclosed.

18 Claims, 8 Drawing Sheets

APPARATUS, SYSTEM, AND METHOD FOR ACCELERATING BITMAP LOOKUPS IN NETWORK DEVICES

BACKGROUND

Computing devices may implement bitmaps for a variety of purposes. For example, a computing device may use a bitmap to represent a graphical image displayed on a monitor. In another example, a computing device may use a bitmap to manage and/or represent memory blocks on a storage device. In this example, the computing device may determine whether a certain memory block is free or allocated by checking the bitmap.

As a specific example, a traditional network device may include a fixed-size block allocator that uses a bitmap to maintain the current state of certain memory blocks and/or resources. Unfortunately, as the number of memory blocks and/or resources increases, so too does the amount of time needed to search the bitmap for free memory blocks and/or resources or to allocate and/or deallocate memory blocks and/or resources. As a result, the traditional network device may consume a vast amount of computing resources during searches, allocations, and/or deallocations, thereby slowing down the traditional network device and/or impairing its performance.

The instant disclosure, therefore, identifies and addresses a need for improved and/or additional apparatuses, systems, and methods for accelerating bitmap lookups in network devices.

SUMMARY

As will be described in greater detail below, the instant disclosure generally relates to apparatuses, systems, and methods for accelerating bitmap lookups in network devices. In one example, an apparatus for accomplishing such a task may include at least one storage device that facilitates storing a hierarchical bitmap tree that includes (1) a root node that includes a root index and a set of lookup indexes that each correspond to a bit included in the root index and (2) a set of leaf nodes that each correspond to a bit included in one of the set of lookup indexes within the root node, wherein each of the set of leaf nodes includes a leaf index and a set of objects that each correspond to a bit included in the leaf index. The apparatus may also include at least one processing unit that is communicatively coupled to the storage device. The processing unit may manage memory in connection with a computing device by (1) searching the root index of the root node for a bit indicating that one of the set of lookup indexes corresponds to a leaf node that references an unallocated memory location, (2) identifying, within the one of the set of lookup indexes, a bit indicating that one of the set of leaf nodes references the unallocated memory location, (3) searching the leaf index of the one of the set of leaf nodes for a bit indicating that one of the set of objects within the one of the set of leaf nodes corresponds to the unallocated memory location, (4) identifying, within the one of the set of objects, a bit that corresponds to a specific memory location and indicates that the specific memory location is currently unallocated, and then (5) allocating the specific memory location for use by the computing device.

Similarly, a router incorporating the above-described apparatus may include at least one storage device that facilitates storing a hierarchical bitmap tree that includes (1) a root node that includes a root index and a set of lookup indexes that each correspond to a bit included in the root index and (2) a set of leaf nodes that each correspond to a bit included in one of the set of lookup indexes within the root node, wherein each of the set of leaf nodes includes a leaf index and a set of objects that each correspond to a bit included in the leaf index. The router may also include at least one physical processor that is communicatively coupled to the storage device. The physical processor may manage memory in connection with the router by (1) searching the root index of the root node for a bit indicating that one of the set of lookup indexes corresponds to a leaf node that references an unallocated memory location, (2) identifying, within the one of the set of lookup indexes, a bit indicating that one of the set of leaf nodes references the unallocated memory location, (3) searching the leaf index of the one of the set of leaf nodes for a bit indicating that one of the set of objects within the one of the set of leaf nodes corresponds to the unallocated memory location, (4) identifying, within the one of the set of objects, a bit that corresponds to a specific memory location and indicates that the specific memory location is currently unallocated, and then (5) allocating the specific memory location for use by the router.

A corresponding method may include (1) searching a root index of a root node for a bit indicating that a specific lookup index within a set of lookup indexes leads to an object that references an unallocated memory location, (2) identifying, within the specific lookup index, a bit indicating that a specific leaf node within a set of leaf nodes leads to the object that references the unallocated memory location, (3) searching a leaf index of the specific leaf node for a bit indicating that a specific object within a set of objects references the unallocated memory location, (4) identifying, within the specific object, a bit that corresponds to a specific memory location and indicates that the specific memory location is currently unallocated, and then (5) allocating the specific memory location for use by a computing device.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
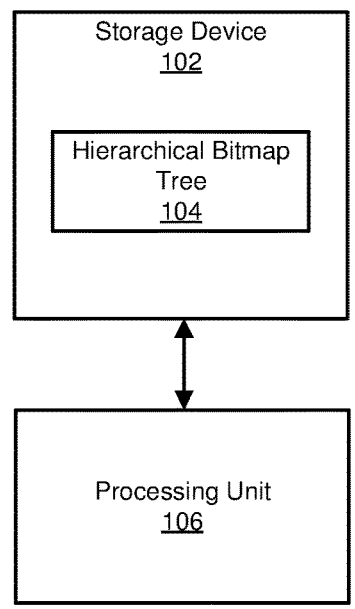
FIG. 1 is a block diagram of an exemplary apparatus for accelerating bitmap lookups in network devices.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure describes various apparatuses, systems, and methods for accelerating bitmap lookups in network devices. As will be explained in greater detail below, embodiments of the instant disclosure may maintain a hierarchical bitmap tree with multiple layers and/or levels such that each node within those layers and/or levels has an index that facilitates accelerated bitmap lookups. For example, embodiments of the instant disclosure may provide a hierarchical bitmap tree that includes a root node. In this example, the root node may include a root index whose bits correspond to different lookup indexes. Each of these lookup indexes may include bits that correspond to different leaf nodes within the hierarchical bitmap tree.

Similar to the root node, each of these leaf nodes may include a leaf index whose bits correspond to different objects. Each of these objects may include bits that correspond to a specific memory location. Moreover, each of these bits included in the objects may indicate, based on their current state, whether the corresponding memory location is currently allocated or unallocated. In other words, each of these bits may indicate whether the corresponding memory location is free and/or available for use by a computing device.

The following will provide, with reference to FIG. 1, examples of apparatuses that facilitate accelerating bitmap lookups in network devices. The discussion corresponding to FIG. 2 will provide a detailed description of implementations that facilitate accelerating bitmap lookups in network devices. The discussion corresponding to FIGS. 3-6 will provide a detailed description of how the embodiments of the instant disclosure achieve accelerated bitmap lookups in network devices. The discussion corresponding to FIG. 7 will provide a detailed description of an exemplary method for accelerating bitmap lookups in network devices. Finally, the discussion corresponding to FIG. 8 will provide numerous examples of systems that may include the apparatus shown in FIG. 1.

FIG. 1 shows a block diagram of an exemplary apparatus 100 for accelerating bitmap lookups in network devices. Examples of apparatus 100 include, without limitation, network devices, routers, switches, hubs, modems, bridges, repeaters, gateways, multiplexers, network adapters, computing devices, servers, client devices, portions of one or more of the same, variations or combinations of one or more of the same, and/or any other suitable apparatus.

The term "bitmap lookup," as used herein, generally refers to any process and/or algorithm that involves looking up a certain bit within a bitmap and/or searching through a bitmap. In one example, a bitmap may include and/or represent an array of bits in which a "0" corresponds to a free memory location and a "1" corresponds to an allocated memory location. In this example, a bitmap lookup may involve searching the bitmap for the first "0" that corresponds to a free memory location. In another example, the states may be reversed such that a "0" corresponds to an allocated memory location and a "1" corresponds to a free memory location.

As illustrated in FIG. 1, apparatus 100 may include one or more storage devices, such as storage device 102. Storage device 102 generally represents any type or form of volatile or non-volatile storage device or medium capable of storing data and/or computer-readable instructions. Examples of storage device 102 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

In some examples, storage device 102 may store and/or maintain a hierarchical bitmap tree 104. In one example, hierarchical bitmap tree 104 may include and/or represent a tree data structure with multiple nodes arranged in different layers and/or levels. In this example, one of these nodes may represent a root of the tree. The root node may include and/or represent the top layer and/or level of the tree. In other words, the root node may include and/or represent the starting and/or entry point of a bitmap lookup.

Continuing with this example, another one of these nodes may represent a leaf of the tree. In this example, the leaf node may include and/or represent the bottom layer and/or level of the tree. In other words, the leaf node may include and/or represent the ending point and/or target of a bitmap lookup.

In addition, another one of these nodes may represent an intermediary of the tree. In this example, the intermediate node may include and/or represent a middle layer and/or level of the tree. In other words, the intermediate node may represent and/or serve as a via and/or path that leads from the root node to the leaf node.

In one example, the root node may include a root index and a set of lookup indexes. In this example, the root index may include and/or represent an array of bits that each correspond to a different lookup index within the root node. Each lookup index may include and/or represent an array of bits that each correspond to a different leaf node.

Continuing with this example, each leaf node may include a leaf index and a set of objects. In this example, the leaf index may include and/or represent an array of bits that each correspond to a different object with in the leaf node. Each object may include and/or represent an array of bits that each correspond to a specific memory location and indicates whether that memory location is currently allocated or unallocated.

As illustrated in FIG. 1, exemplary system 100 may also include one or more processing units, such as processing unit 106. Processing unit 106 generally represents any type or form of hardware-implemented processing unit capable of interpreting and/or executing computer-readable instructions. In one example, processing unit 106 may access and/or modify hierarchical bitmap tree 104 in storage device 102. Examples of processing unit 106 include, without limitation, physical processors, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable processing unit.

Figure 2:
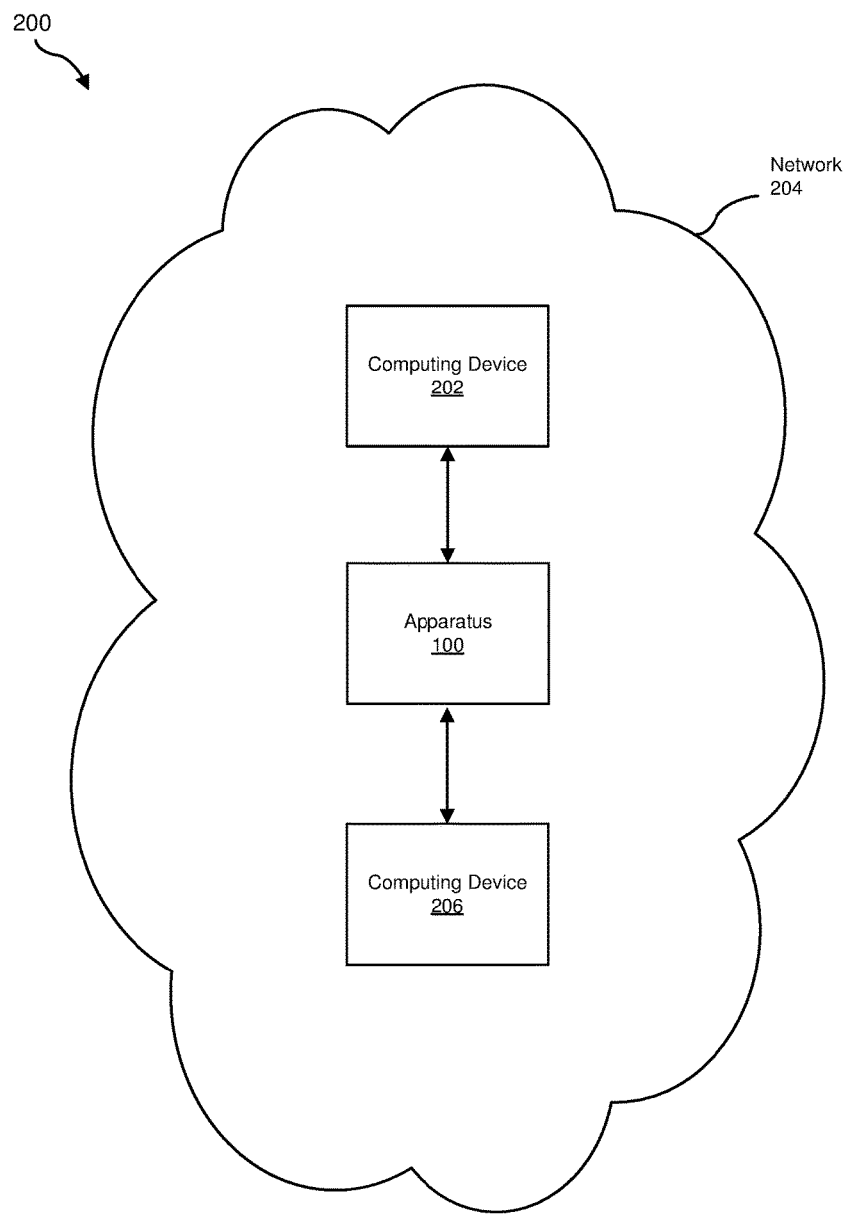
FIG. 2 is a block diagram of an exemplary implementation of an apparatus for accelerating bitmap lookups in network devices.

System 100 in FIG. 1 may be implemented in a variety of ways and/or contexts. As a specific example, FIG. 2 shows a block diagram of an exemplary implementation 200 that includes apparatus 100 for accelerating bitmap lookups in network devices. As illustrated in FIG. 2, implementation 200 may include a network 204 that consists of multiple computing devices. For example, network 204 may include and/or represent computing device 202, computing device 206, and/or apparatus 100. In this example, computing devices 202 and 206 may be able to exchange communications with one another via apparatus 100.

Computing devices 202 and 206 each generally represent any type or form of computing device capable of reading computer-executable instructions. In one example, computing devices 202 and 206 may each include and/or represent a network device (such as a router, switch, and/or gateway). Additional examples of computing devices 202 and 206 include, without limitation, client devices, servers, laptops, tablets, desktops, storage devices, cellular phones, Personal Digital Assistants (PDAs), multimedia players, embedded systems, wearable devices (e.g., smart watches, smart glasses, etc.), gaming consoles, variations or combinations of one or more of the same, and/or any other suitable computing devices.

Network 204 generally represents any medium or architecture capable of facilitating communication or data transfer. In one example, network 204 may facilitate communication between computing devices 202 and 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network. Although not necessarily illustrated in this way in FIG. 2, network 204 may also include and/or represent various other computing devices in addition to computing devices 202 and 206 and apparatus 100.

In some examples, processing unit 106 of apparatus 100 may search the root index of the root node for a bit indicating that one of the lookup indexes of the root node corresponds to a leaf node that references an unallocated memory location. For example, processing unit 106 may search the root index for the first bit that leads to an object that references an unallocated memory location. Upon finding such a bit within the root index, processing unit 106 may traverse from the root index to the lookup index to which that bit corresponds.

In one example, processing unit 106 may search that lookup index for a bit indicating that one of the leaf nodes references an unallocated memory location. For example, processing unit 106 may search the lookup index for the first bit that leads to an object that references an unallocated memory location. Upon encountering and/or finding such a bit within the lookup index, processing unit 106 may traverse from that lookup index of the root node to the leaf node to which that bit corresponds.

In one example, processing unit 106 may search the leaf index of that leaf node for a bit indicating that one of the objects within that leaf node references an unallocated memory location. For example, processing unit 106 may search the leaf index for the first bit that leads to an object that references an unallocated memory location. Upon encountering and/or finding such a bit within the leaf index, processing unit 106 may traverse from the leaf index of that leaf node to the object to which that bit corresponds.

In one example, processing unit 106 may search that object for a bit that represents and/or corresponds to an unallocated memory location. For example, processing unit 106 may search the object for the first bit indicating that the memory location represented by that bit is currently unallocated. Upon encountering and/or finding such a bit within the object, processing unit 106 may traverse from the object to that specific memory location and/or allocate the same for use by apparatus 100.

Figure 3:
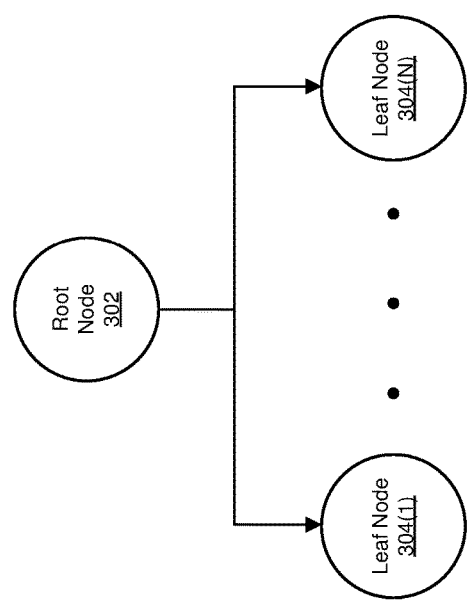
FIG. 3 is an illustration of an exemplary hierarchical bitmap tree.

FIG. 3 illustrates an exemplary hierarchical bitmap tree 300. As illustrated in FIG. 3, hierarchical bitmap tree 300 may represent a configuration and/or arrangement that includes a root node 302 and leaf nodes 304(1)-(N). As described in greater detail below, root node 302 may include a root index and a set of lookup indexes, and each of leaf nodes 304(1)-(N) may include a leaf index and a set of objects.

Figure 4:
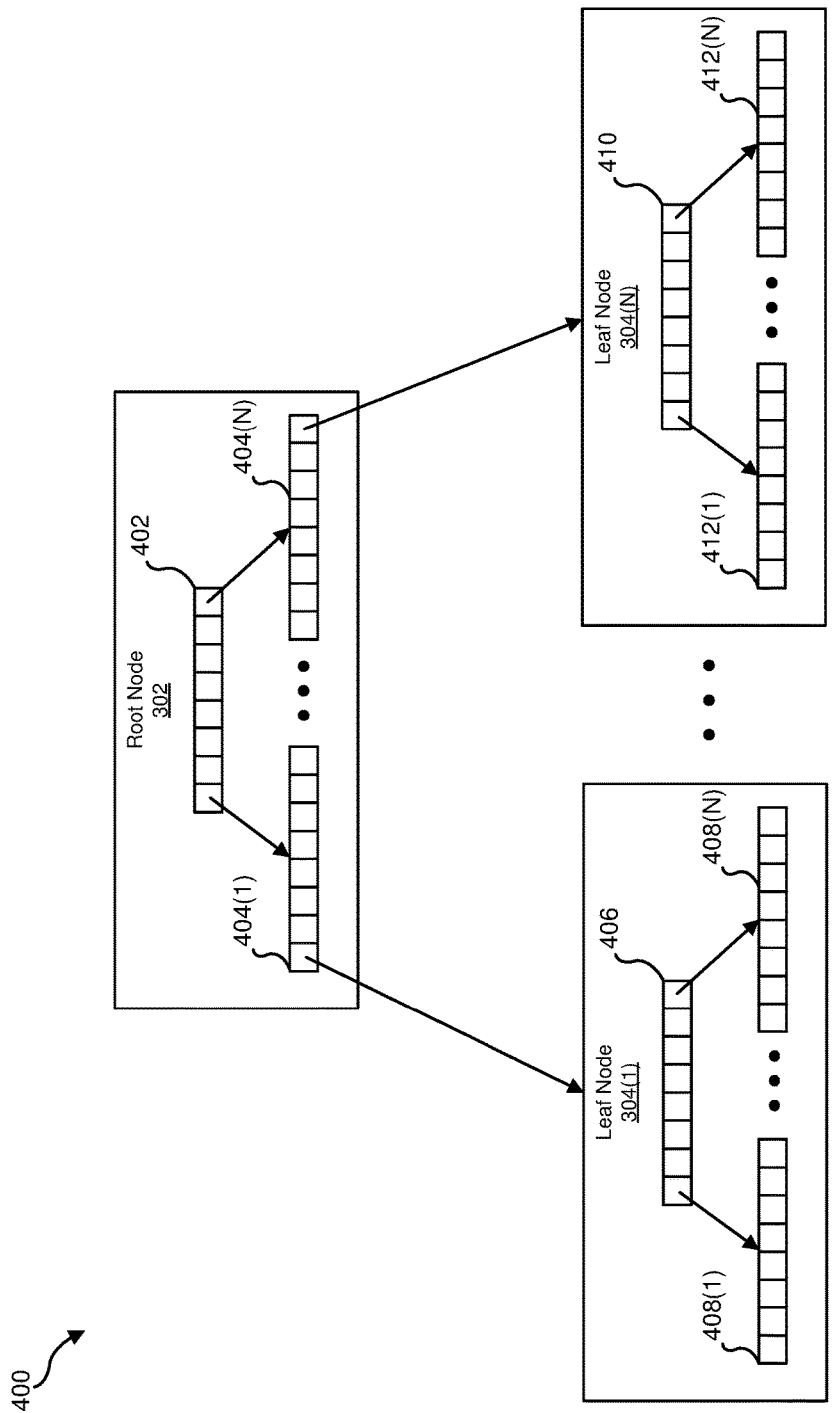
FIG. 4 is an illustration of an exemplary hierarchical bitmap tree.

FIG. 4 illustrates an exemplary hierarchical bitmap tree 400. As illustrated in FIG. 4, hierarchical bitmap tree 400 may include root node 302 and leaf nodes 304(1)-(N). In this example, root node 302 may include a root index 402 that consists of an array of bits. In addition, root node 302 may include a set of lookup indexes 404(1)-(N) that each consist of an array of bits. Accordingly, root node 302 itself may represent and/or be configured as a tree structure that includes root index 402 and lookup indexes 404(1)-(N).

As indicated by the arrow connecting the first bit of root index 402 to lookup index 404(1), the first bit of root index 402 may represent lookup index 404(1) such that the state of the first bit of root index 402 indicates whether lookup index 404(1) leads to any unallocated memory locations. Similarly, as indicated by the arrow connecting the last bit of root index 402 to lookup index 404(N), the last bit of root index 402 may represent lookup index 404(N) such that the state of the last bit of root index 402 indicates whether lookup index 404(N) leads to any unallocated memory locations.

Continuing with this example, leaf node 304(1) may include a leaf index 406 that consists of an array of bits. Leaf node 304(1) may also include a set of objects 408(1)-(N) that each consist of an array of bits. Accordingly, leaf node 304(1) itself may represent and/or be configured as a tree structure that includes leaf index 406 and objects 408(1)-(N). As indicated by the arrow connecting the first bit of lookup index 404(1) to leaf node 304(1), the first bit of lookup index 404(1) may represent leaf node 304(1) such that the state of the first bit of lookup index 404(1) indicates whether leaf node 304(1) leads to any unallocated memory locations.

Similarly, as indicated by the arrow connecting the first bit of leaf index 406 to object 408(1), the first bit of leaf index 406 may represent object 408(1) such that the state of the first bit of leaf index 406 indicates whether object 408(1) leads to any unallocated memory locations. Moreover, as indicated by the arrow connecting the last bit of leaf index 406 to object 408(N), the last bit of leaf index 406 may represent object 408(N) such that the state of the last bit of leaf index 406 indicates whether object 408(N) leads to any unallocated memory locations.

In this example, leaf node 304(N) may include a leaf index 410 that consists of an array of bits. Leaf node 304(N) may also include a set of objects 412(1)-(N) that each consist of an array of bits. Accordingly, leaf node 304(N) itself may represent and/or be configured as a tree structure that includes leaf index 410 and objects 412(1)-(N). As indicated by the arrow connecting the last bit of lookup index 404(N) to leaf node 304(N), the last bit of lookup index 404(N) may represent leaf node 304(N) such that the state of the last bit of lookup index 404(N) indicates whether leaf node 304(N) leads to any unallocated memory locations.

Similarly, as indicated by the arrow connecting the first bit of leaf index 410 to object 412(1), the first bit of leaf index 410 may represent object 412(1) such that the state of the first bit of leaf index 410 indicates whether object 412(1) leads to any unallocated memory locations. Moreover, as indicated by the arrow connecting the last bit of leaf index 410 to object 412(N), the last bit of leaf index 410 may represent object 412(N) such that the state of the last bit of leaf index 410 indicates whether object 412(N) leads to any unallocated memory locations.

In some examples, root node 302 may represent a parent node relative to leaf nodes 304(1)-(N). Likewise, leaf nodes 304(1)-(N) may each represent a child node relative to root node 302. Additionally or alternatively, root index 402 may represent a parent node relative to lookup indexes 404(1)-(N), and lookup indexes 404(1)-(N) may each represent a child node relative to root index 402.

Similarly, leaf index 406 may represent a parent node relative to objects 408(1)-(N), and objects 408(1)-(N) may each represent a child node relative to leaf index 406. Moreover, leaf index 410 may represent a parent node relative to objects 412(1)-(N), and objects 412(1)-(N) may each represent a child node relative to leaf index 410.

Hierarchical bitmap tree 400 may provide and/or facilitate certain improvements and/or advantages over traditional approaches. For example, hierarchical bitmap tree 400 may be stored such that root index 402 and lookup indexes 404(1)-(N) reside in contiguous memory locations, as opposed to being stored in memory locations that are remote from one another. As a result, hierarchical bitmap tree 400 may improve caching by mitigating, reducing, and/or eliminating cache miss and/or page miss exceptions. Accordingly, hierarchical bitmap tree 400 may facilitate co-locating two layers and/or levels of the tree to achieve faster lookups by saving time on cache miss and/or page miss exceptions.

Figure 5:
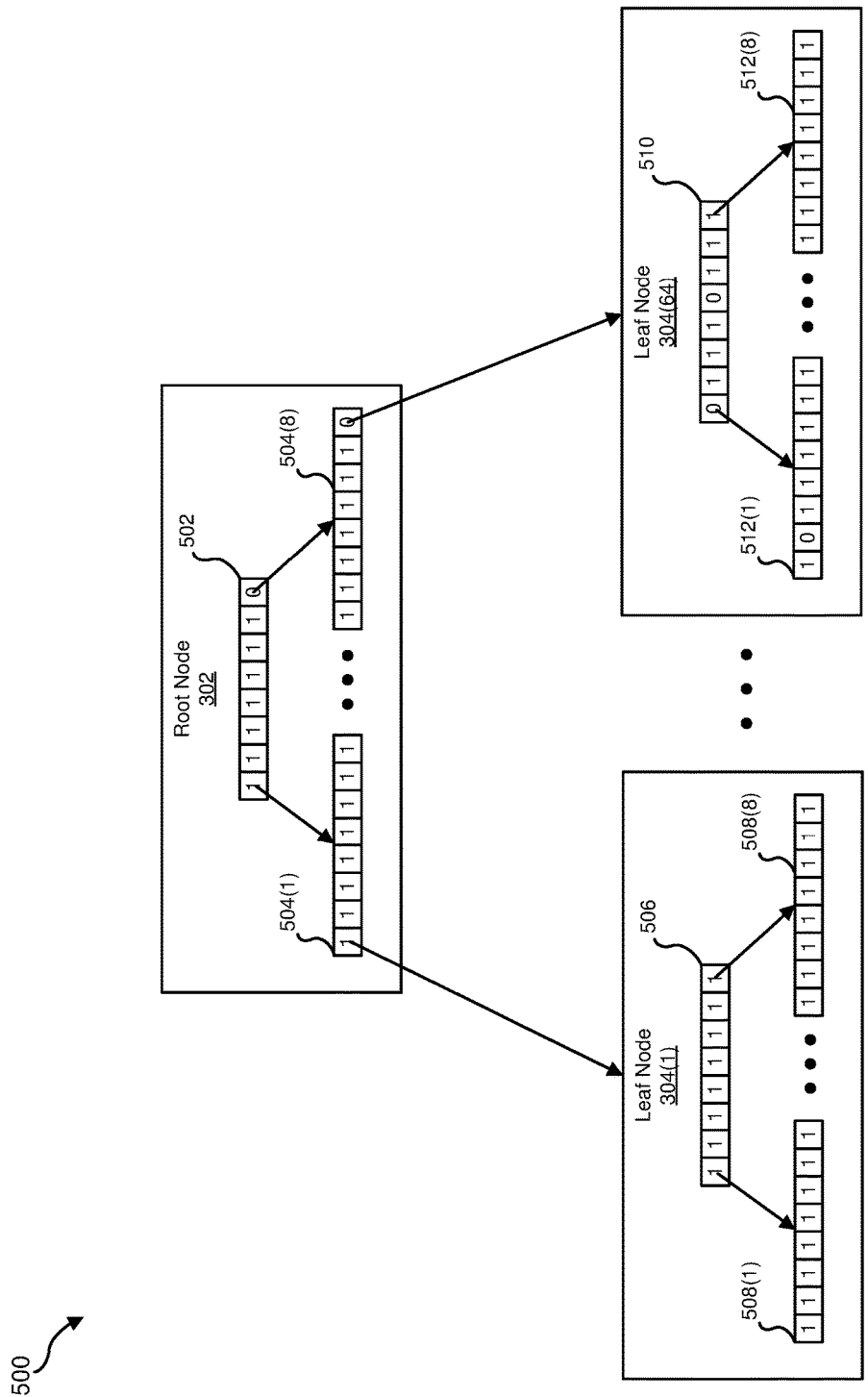
FIG. 5 is an illustration of an exemplary hierarchical bitmap tree.

FIG. 5 illustrates an exemplary hierarchical bitmap tree 500. As illustrated in FIG. 5, hierarchical bitmap tree 500 may include root node 302 and leaf nodes 304(1)-(64). In this example, root node 302 may include a root index 502 that consists of an array of 8 bits. In addition, root node 302 may include a set of lookup indexes 504(1)-(8) that each consist of an array of 8 bits. Accordingly, root node 302 may include and/or represent a total of 9 bytes or 72 bits.

Similarly, each of leaf nodes 304(1)-(64) may include a leaf index (e.g., leaf indexes 506 and 510) that consists of an array of 8 bits. In addition, each of leaf nodes 304(1)-(64) may include a set of objects (e.g., objects 508(1)-(8) and 512(1)-(8)) that each consist of an array of 8 bits. Accordingly, each of leaf nodes 304(1)-(64) may include and/or represent a total of 9 bytes or 72 bits. Thus, hierarchical bitmap tree 500 may include and/or represent a total of 585 bytes or 4680 bits.

As illustrated in FIG. 5, root index 502 may include the array "11111110". In this example, the "1" state may indicate that the corresponding lookup index does not point and/or lead to any unallocated memory locations. In other words, the "1" state may indicate that all of the memory locations referenced by objects accessible via the corresponding lookup index are currently allocated and/or unavailable.

In contrast, the "0" state may indicate that the corresponding lookup index points and/or leads to at least one unallocated memory location. In other words, the "0" state may indicate that at least one memory location referenced by an object accessible via the corresponding lookup index is currently unallocated and/or available for use.

In one example, processing unit 106 may search root index 502 bit by bit until encountering and/or finding one indicating that the corresponding lookup index points and/or leads to at least one unallocated memory location. For example, processing unit 106 may start by inspecting the left-most bit in root index 502. Since, in this example, the state of the left-most bit in root index 502 is "1", processing unit 106 may determine that lookup index 504(1) does not point and/or lead to any unallocated memory locations. In other words, and as illustrated in FIG. 5, the state of all the bits included in leaf index 506 and objects 508(1)-(8) within leaf node 304(1) may be "1".

Processing unit 106 may continue searching root index 502 by moving toward the right side of root index 502. Since, in this example, the state of the next several bits in root index 502 is "1", processing unit 106 may determine that their corresponding lookup indexes (not explicitly illustrated in FIG. 5) do not point and/or lead to any unallocated memory locations. In other words, the state of all the bits included in the leaf index and objects within the leaf nodes accessible via the corresponding lookup indexes may be "1".

Finally, processing unit 106 may arrive at the last and/or right-most bit of root index 502. Since, in this example, the state of the right-most bit in root index 502 is "0", processing unit 106 may determine that lookup index 504(8) points and/or leads to at least one unallocated memory location. In other words, and as illustrated in FIG. 5, the state of multiple bits included in leaf index 510 and objects 512(1)-(8) within leaf node 304(64) may be "0".

Upon determining that lookup index 504(8) points and/or leads to at least one unallocated memory location, processing unit 106 may terminate the search of root index 502 and then traverse from root index 502 to lookup index 504(8) to inspect the same. For example, processing unit 106 may search lookup index 504(8) bit by bit until encountering and/or finding one indicating that the corresponding leaf node points and/or leads to at least one unallocated memory location. In this example, processing unit 106 may start by inspecting the left-most bit in lookup index 504(8). Since, in this example, the state of the left-most bit in lookup index 504(8) is "1", processing unit 106 may determine that the corresponding leaf node (not explicitly illustrated in FIG. 5) does not point and/or lead to any unallocated memory locations. In other words, the state of all the bits included in the leaf index and objects within the leaf node corresponding to the left-most bit in lookup index 504(8) may be "1".

Processing unit 106 may continue searching lookup index 504(8) by moving toward the right side of lookup index 504(8). Since, in this example, the state of the next several bits in lookup index 504(8) is "1", processing unit 106 may determine that their corresponding leaf nodes (not explicitly illustrated in FIG. 5) do not point and/or lead to any unallocated memory locations. In other words, the state of all the bits included in the leaf indexes and objects within the leaf nodes corresponding to those bits in lookup index 504(8) may be "1".

Finally, processing unit 106 may arrive at the last and/or right-most bit of lookup index 504(8). Since, in this example, the state of the right-most bit in lookup index 504(8) is "0", processing unit 106 may determine that at least one memory location referenced by an object included in leaf node 304(64) is currently unallocated and/or available for use. In other words, and as illustrated in FIG. 5, the state of multiple bits included in leaf index 510 and objects 512(1)-(8) within leaf node 304(64) may be "0".

Upon determining that leaf node 304(64) points and/or leads to at least one unallocated memory location, processing unit 106 may terminate the search of lookup index 504 and then traverse from lookup index 504(8) to leaf node 304(64) to inspect the same. For example, processing unit 106 may search leaf index 510 bit by bit until encountering and/or finding one indicating that the corresponding object points and/or leads to at least one unallocated memory location. In this example, processing unit 106 may start by inspecting the left-most bit in leaf index 510. Since, in this example, the state of the left-most bit in leaf node 304(64) is "0", processing unit 106 may determine that at least one memory location referenced by object 512(1) is currently unallocated and/or available for use. In other words, and as illustrated in FIG. 5, one bit included in object 512(1) within leaf node 304(64) may be "0".

Upon determining that object 512(1) points and/or leads to at least one unallocated memory location, processing unit 106 may terminate the search of leaf index 510 and then traverse from leaf index 510 to object 512(1) to inspect the same. For example, processing unit 106 may search object 512(1) bit by bit until encountering and/or finding one indicating the corresponding memory location is currently unallocated and/or available for use. In this example, processing unit 106 may start by inspecting the left-most bit in object 512(1). Since, in this example, the state of the left-most bit in object 512(1) is "1", processing unit 106 may determine that the corresponding memory location is currently allocated and/or unavailable.

Processing unit 106 may continue searching object 512(1) by moving toward the right side of object 512(1). Since, in this example, the state of the very next bit in object 512(1) is "0", processing unit 106 may determine that the memory location referenced and/or represented by that bit in object 512(1) is currently unallocated and/or available for use. Processing unit 106 may then terminate its search and/or traversal of object 512(1) and/or hierarchical bitmap tree 500. In other words, upon encountering and/or finding the first "0" state bit in an object within a leaf node of hierarchical bitmap tree 500, processing unit 106 may have no need to continue searching for further unallocated memory locations. Instead, processing unit 106 may simply identify the memory location represented by that bit and then allocate that memory location for use by apparatus 100.

In some examples, processing unit 106 may deallocate and/or release a memory location to free up space for use by apparatus 100. In such examples, processing unit 106 may modify and/or update hierarchical bitmap tree 500 to account for this deallocation and/or release. For example, in the event that the memory location represented by the left-most bit in object 508(1) is deallocated and/or released, processing unit 106 may change the state of that bit from "1" to "0". In this example, processing unit 106 may identify that bit within object 508(1) and then configure that bit to indicate that the memory location is no longer allocated.

Continuing with this example, processing unit 106 may traverse from that bit in object 508(1) to the corresponding bit (in this case, the left-most bit) in leaf index 506. Processing unit 106 may change the state of that bit from "1" to "0". In this example, processing unit 106 may identify that bit within leaf index 506 and then configure that bit to indicate that object 508(1) references at least one unallocated memory location.

Further, processing unit 106 may traverse from that bit in leaf index 506 to the corresponding bit (in this case, the left-most bit) in lookup index 504(1). Processing unit 106 may change the state of that bit from "1" to "0". In this example, processing unit 106 may identify that bit within lookup index 504(1) and then configure that bit to indicate that leaf node 304(1) includes an object that references at least one unallocated memory location.

Continuing with this example, processing unit 106 may traverse from that bit in lookup index 504(1) to the corresponding bit (in this case, the left-most bit) in root index 502. Processing unit 106 may change the state of that bit from "1" to "0". In this example, processing unit 106 may identify that bit within root index 502 and then configure that bit to indicate that lookup index 504(1) points and/or leads to at least one unallocated memory location.

In some examples, processing unit 106 may allocate and/or store data in a memory location. In such examples, processing unit 106 may modify and/or update hierarchical bitmap tree 500 to account for this allocation and/or data storage. For example, in the event that the memory location represented by the second bit from the left in object 512(1) is allocated, processing unit 106 may change the state of that bit from "0" to "1". In this example, processing unit 106 may identify that bit within object 512(1) and then configure that bit to indicate that the memory location is no longer unallocated and/or available.

Continuing with this example, processing unit 106 may traverse from that bit in object 512(1) to the corresponding bit (in this case, the left-most bit) in leaf index 510. Processing unit 106 may change the state of that bit from "0" to "1". In this example, processing unit 106 may identify that bit within leaf index 510 and then configure that bit to indicate that object 512(1) no longer references any unallocated memory locations.

Further, assuming that each bit in leaf index 510 is now set (e.g., both the left-most bit and the fifth bit from the left have been changed from "0" to "1"), processing unit 106 may traverse from leaf index 510 to the corresponding bit (in this case, the right-most bit) in lookup index 504(8). Processing unit 106 may change the state of that bit from "0" to "1". In this example, processing unit 106 may identify that bit within lookup index 504(1) and then configure that bit to indicate that leaf node 304(64) no longer includes any objects that references at least one unallocated memory location.

Continuing with this example, processing unit 106 may traverse from that bit in lookup index 504(8) to the corresponding bit (in this case, the right-most bit) in root index 502. Processing unit 106 may change the state of that bit from "0" to "1". In this example, processing unit 106 may identify that bit within root index 502 and then configure that bit to indicate that lookup index 504(8) no longer points or leads to at least one unallocated memory location.

In some examples, processing unit 106 may implement a fixed-size block allocator to manage memory in connection with apparatus 100. In one example, the memory managed by processing unit 106 may include and/or represent a slow counter that tracks performance of at least one component of apparatus 100. Additionally or alternatively, the memory managed by processing unit 106 may include and/or represent a routing table that stores routes that define paths to other computing devices within network 204.

In some examples, processing unit 106 may compute the index of a free bit using a lookup table accelerator. For example, processing unit 106 may create and/or generate a small array (e.g., a 256-object array) in which each entry is indexed by an 8-bit value and whose value is the first free bit.

Figure 6:
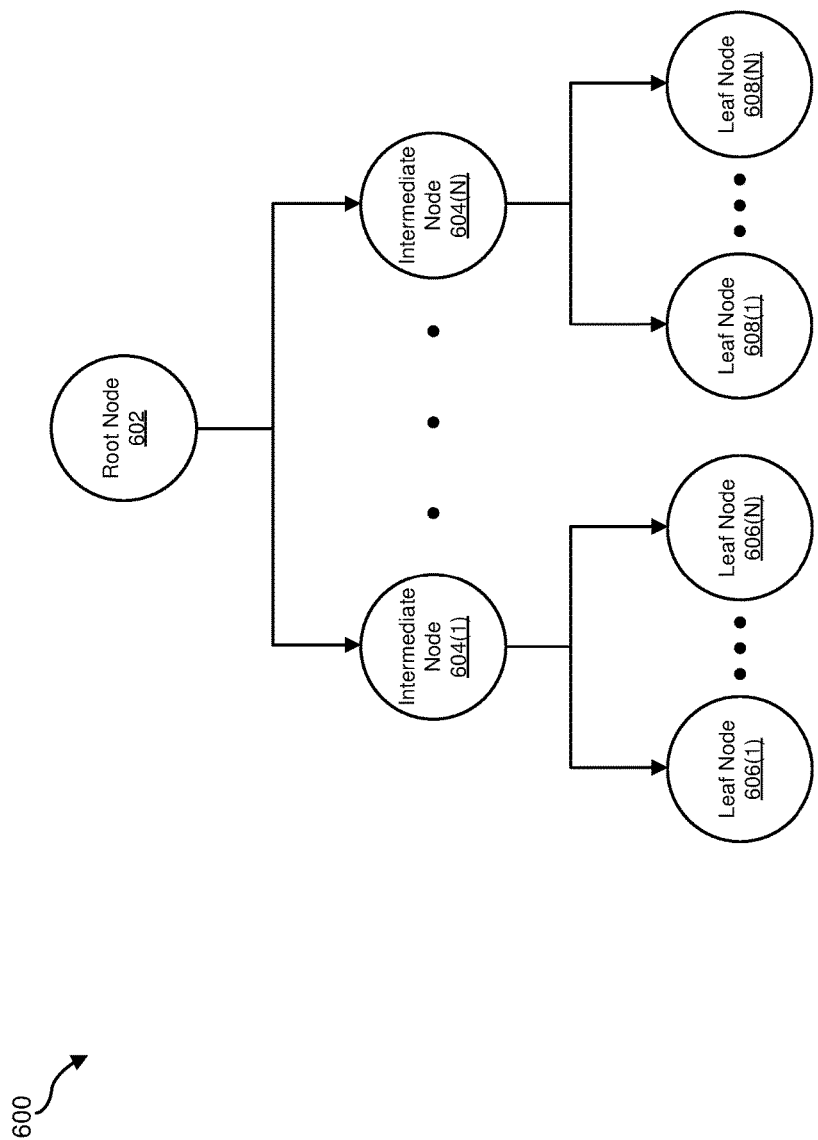
FIG. 6 is an illustration of an exemplary hierarchical bitmap tree.

FIG. 6 is an illustration of an exemplary hierarchical bitmap tree 600. As illustrated in FIG. 6, hierarchical bitmap tree 600 may represent a configuration and/or arrangement that includes a root node 602, intermediate nodes 604(1)-(N), and leaf nodes 606(1)-(N) and 608(1)-(N). In addition to hierarchical bitmap trees 300 in FIG. 3, 400 in FIG. 4, 500 in FIG. 5, and 600 in FIG. 6, various other hierarchical bitmap trees and/or configurations may be implemented in accordance with the embodiments of the instant application. For example, the embodiments of the instant application may implement a hierarchical bitmap tree that includes multiple layers and/or levels of intermediate nodes in between the root node and leaf nodes. Processing unit 106 may be able to perform the same techniques described above to achieve accelerated bitmap lookups in connection with such a hierarchical bitmap tree.

Figure 7:
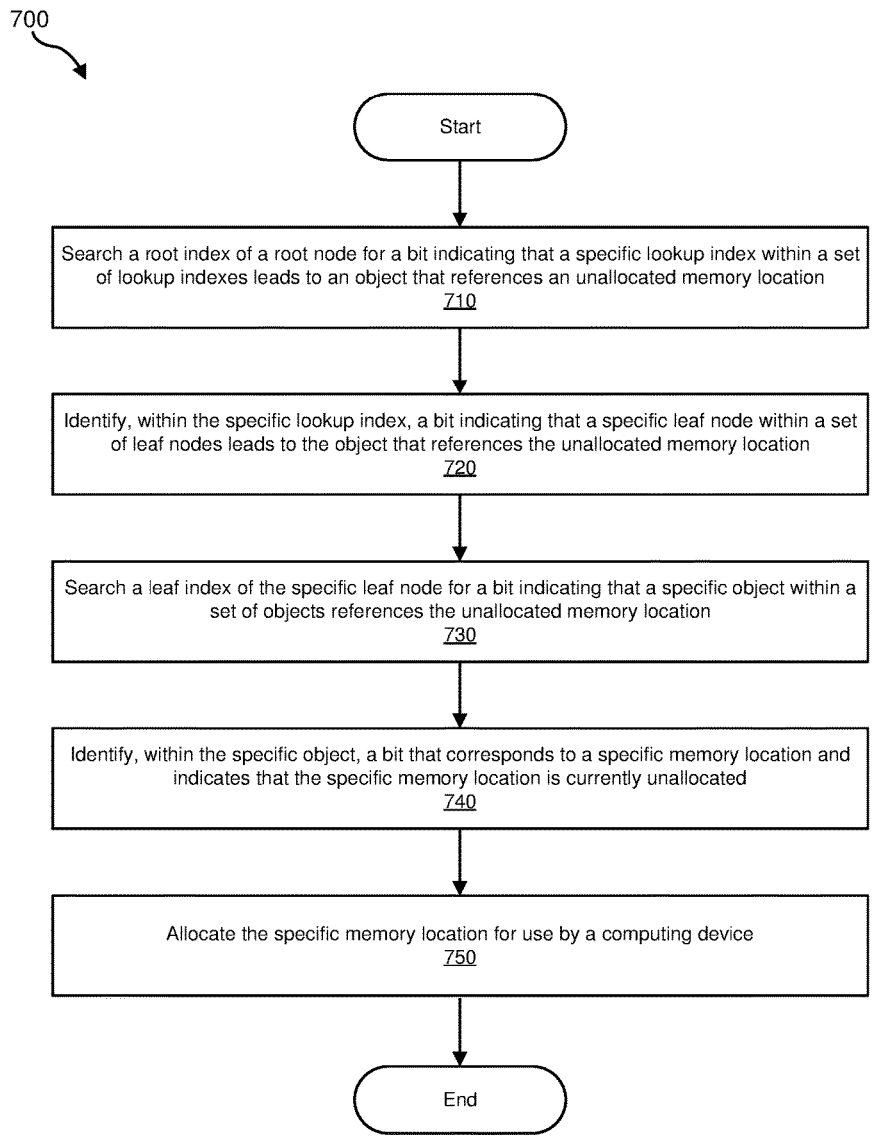
FIG. 7 is a flow diagram of an exemplary method for accelerating bitmap lookups in network devices.

FIG. 7 is a flow diagram of an exemplary method 800 for accelerating bitmap lookups in network devices. Method 700 may include the step of searching a root index of a root node for a bit indicating that a specific leaf index within a set of leaf indexes leads to an object that references an unallocated memory location (710). This searching step may be performed in a variety of ways. For example, a network device may identify a root node within a hierarchical bitmap tree. In this example, the network device may identify a root index within the root node. The network device may then search the root index bit by bit for a bit state that represents an indication of an unallocated memory location. During this search, the network device may find, within the root index, a bit whose state represents an indication of an unallocated memory location.

Returning to FIG. 7, method 700 may also include the step of identifying, within the specific lookup index, a bit indicating that a specific leaf node within a set of leaf nodes leads to the object that references the unallocated memory location (720). This identifying step may be performed in a variety of ways. For example, the network device may identify the lookup index represented by the bit found within the root index. In this example, the network device may search that lookup index bit by bit for a bit state that represents an indication of an unallocated memory location. During this search, the network device may find, within the lookup index, a bit whose state represents an indication of an unallocated memory location.

Returning to FIG. 7, method 700 may also include the step of searching a leaf index of the specific leaf node for a bit indicating that a specific object within a set of objects references the unallocated memory location (730). This searching step may be performed in a variety of ways. For example, the network device may identify the leaf node represented by the bit found within the lookup index. In this example, the network device may identify a leaf index within the leaf node. The network device may then search the leaf index bit by bit for a bit state that represents an indication of an unallocated memory location. During this search, the network device may find, within the leaf index, a bit whose state represents an indication of an unallocated memory location.

Returning to FIG. 7, method 700 may also include the step of identifying, within the specific object, a bit that corresponds to a specific memory location and indicates that the specific memory location is currently unallocated (740). This identifying step may be performed in a variety of ways. For example, the network device may identify the object represented by the bit found within the leaf index. In this example, the network device may search that object bit by bit for a bit state that represents an indication of an unallocated memory location. During this search, the network device may find, within the object, a bit that corresponds to a specific memory location and indicates that this memory location is currently unallocated.

Returning to FIG. 7, method 700 may also include the step of allocating the specific memory location for use by a computing device (750). This allocating step may be performed in a variety of ways. For example, the network device may set aside and/or reserve this memory location for certain data (such as route data and/or slow counter data). In one example, the network device may assign certain data to this memory location. Additionally or alternatively, the network device may store that data in the memory location.

Figure 8:
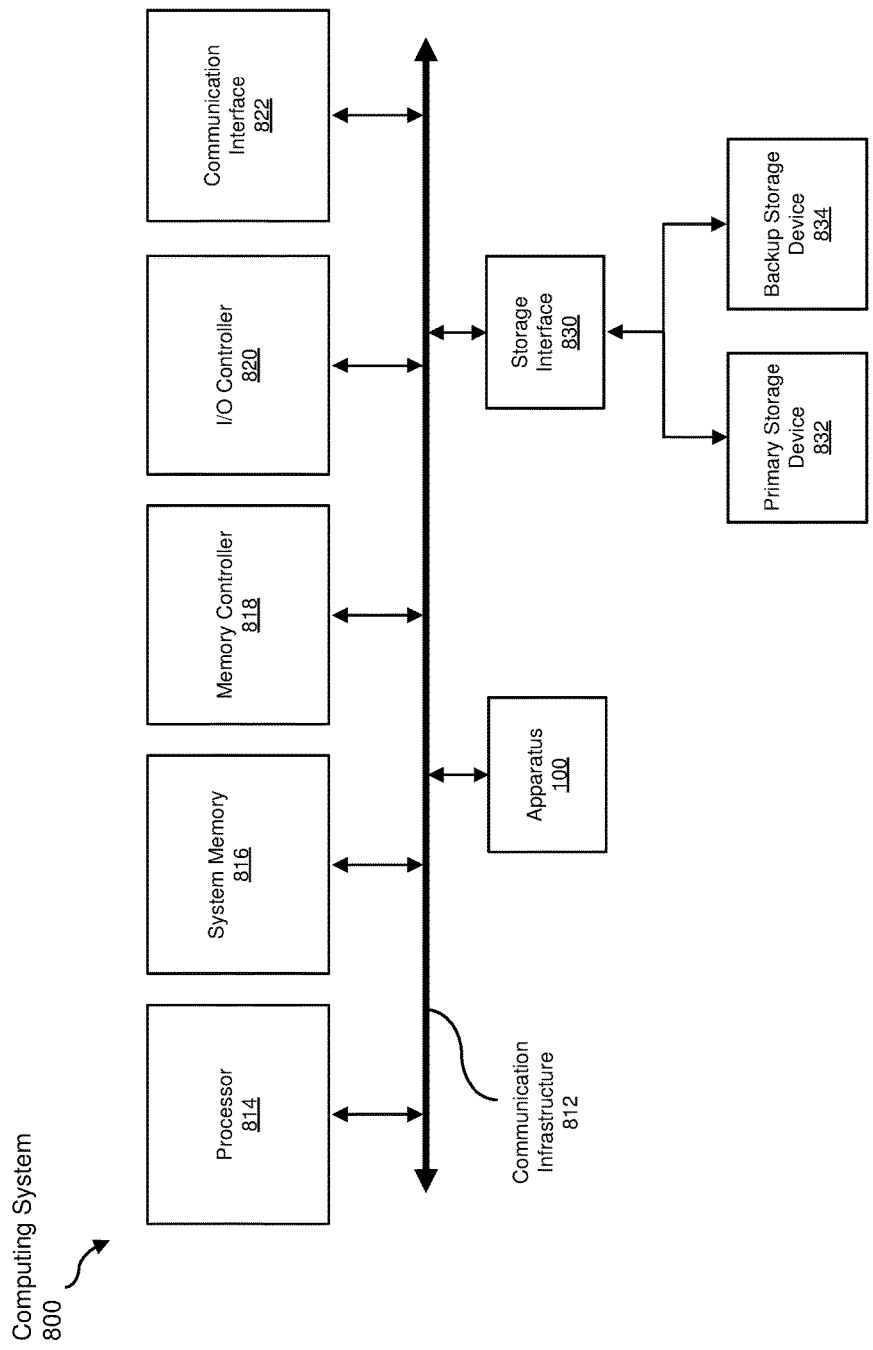
FIG. 8 is a block diagram of an exemplary computing system capable of implementing and/or being used in connection with one or more of the embodiments described and/or illustrated herein.

FIG. 8 is a block diagram of an exemplary computing system 800 capable of implementing and/or being used in connection with one or more of the embodiments described and/or illustrated herein. In some embodiments, all or a portion of computing system 800 may perform and/or be a means for performing, either alone or in combination with other elements, one or more of the steps described in connection with FIG. 10. All or a portion of computing system 800 may also perform and/or be a means for performing and/or implementing any other steps, methods, or processes described and/or illustrated herein. In one example, computing system 800 may include apparatus 100 from FIG. 1.

Computing system 800 broadly represents any type or form of electrical load, including a single or multi-processor computing device or system capable of executing computer-readable instructions. Examples of computing system 800 include, without limitation, workstations, laptops, client-side terminals, servers, distributed computing systems, mobile devices, network switches, network routers (e.g., PE routers, backbone routers, edge routers, core routers, mobile service routers, broadband routers, etc.), network appliances (e.g., network security appliances, network control appliances, network timing appliances, SSL VPN (Secure Sockets Layer Virtual Private Network) appliances, etc.), network controllers, gateways (e.g., service gateways, mobile packet gateways, multi-access gateways, security gateways, etc.), and/or any other type or form of computing system or device.

Computing system 800 may be programmed, configured, and/or otherwise designed to comply with one or more networking protocols. According to certain embodiments, computing system 800 may be designed to work with protocols of one or more layers of the Open Systems Interconnection (OSI) reference model, such as a physical layer protocol, a link layer protocol, a network layer protocol, a transport layer protocol, a session layer protocol, a presentation layer protocol, and/or an application layer protocol. For example, computing system 800 may include a network device configured according to a Universal Serial Bus (USB) protocol, an Institute of Electrical and Electronics Engineers (IEEE) 1394 protocol, an Ethernet protocol, a T1 protocol, a Synchronous Optical Networking (SONET) protocol, a Synchronous Digital Hierarchy (SDH) protocol, an Integrated Services Digital Network (ISDN) protocol, an Asynchronous Transfer Mode (ATM) protocol, a Point-to-Point Protocol (PPP), a Point-to-Point Protocol over Ethernet (PPPoE), a Point-to-Point Protocol over ATM (PPPoA), a Bluetooth protocol, an IEEE 802.XX protocol, a frame relay protocol, a token ring protocol, a spanning tree protocol, and/or any other suitable protocol.

Computing system 800 may include various network and/or computing components. For example, computing system 800 may include at least one processor 814 and a system memory 816. Processor 814 generally represents any type or form of processing unit capable of processing data or interpreting and executing instructions. For example, processor 814 may represent an application-specific integrated circuit (ASIC), a system on a chip (e.g., a network processor), a hardware accelerator, a general purpose processor, and/or any other suitable processing element.

Processor 814 may process data according to one or more of the networking protocols discussed above. For example, processor 814 may execute or implement a portion of a protocol stack, may process packets, may perform memory operations (e.g., queuing packets for later processing), may execute end-user applications, and/or may perform any other processing tasks.

System memory 816 generally represents any type or form of volatile or non-volatile storage device or medium capable of storing data and/or other computer-readable instructions. Examples of system memory 816 include, without limitation, Random Access Memory (RAM), Read Only Memory (ROM), flash memory, or any other suitable memory device. Although not required, in certain embodiments computing system 800 may include both a volatile memory unit (such as, for example, system memory 816) and a non-volatile storage device (such as, for example, primary storage device 832, as described in detail below). System memory 816 may be implemented as shared memory and/or distributed memory in a network device. Furthermore, system memory 816 may store packets and/or other information used in networking operations.

In certain embodiments, exemplary computing system 800 may also include one or more components or elements in addition to processor 814 and system memory 816. For example, as illustrated in FIG. 8, computing system 800 may include a memory controller 818, an Input/Output (I/O) controller 820, and a communication interface 822, each of which may be interconnected via communication infrastructure 812. Communication infrastructure 812 generally represents any type or form of infrastructure capable of facilitating communication between one or more components of a computing device. Examples of communication infrastructure 812 include, without limitation, a communication bus (such as a Serial ATA (SATA), an Industry Standard Architecture (ISA), a Peripheral Component Interconnect (PCI), a PCI Express (PCIe), and/or any other suitable bus), and a network.

Memory controller 818 generally represents any type or form of device capable of handling memory or data or controlling communication between one or more components of computing system 800. For example, in certain embodiments memory controller 818 may control communication between processor 814, system memory 816, and I/O controller 820 via communication infrastructure 812. In some embodiments, memory controller 818 may include a Direct Memory Access (DMA) unit that may transfer data (e.g., packets) to or from a link adapter.

I/O controller 820 generally represents any type or form of device or module capable of coordinating and/or controlling the input and output functions of a computing device. For example, in certain embodiments I/O controller 820 may control or facilitate transfer of data between one or more elements of computing system 800, such as processor 814, system memory 816, communication interface 822, and storage interface 830.

Communication interface 822 broadly represents any type or form of communication device or adapter capable of facilitating communication between exemplary computing system 800 and one or more additional devices. For example, in certain embodiments communication interface 822 may facilitate communication between computing system 800 and a private or public network including additional computing systems. Examples of communication interface 822 include, without limitation, a link adapter, a wired network interface (such as a network interface card), a wireless network interface (such as a wireless network interface card), and any other suitable interface. In at least one embodiment, communication interface 822 may provide a direct connection to a remote server via a direct link to a network, such as the Internet. Communication interface 822 may also indirectly provide such a connection through, for example, a local area network (such as an Ethernet network), a personal area network, a wide area network, a private network (e.g., a virtual private network), a telephone or cable network, a cellular telephone connection, a satellite data connection, or any other suitable connection.

In certain embodiments, communication interface 822 may also represent a host adapter configured to facilitate communication between computing system 800 and one or more additional network or storage devices via an external bus or communications channel. Examples of host adapters include, without limitation, Small Computer System Interface (SCSI) host adapters, Universal Serial Bus (USB) host adapters, IEEE 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 822 may also enable computing system 800 to engage in distributed or remote computing. For example, communication interface 822 may receive instructions from a remote device or send instructions to a remote device for execution.

As illustrated in FIG. 8, exemplary computing system 800 may also include a primary storage device 832 and/or a backup storage device 834 coupled to communication infrastructure 812 via a storage interface 830. Storage devices 832 and 834 generally represent any type or form of storage device or medium capable of storing data and/or other computer-readable instructions. For example, storage devices 832 and 834 may represent a magnetic disk drive (e.g., a so-called hard drive), a solid state drive, a floppy disk drive, a magnetic tape drive, an optical disk drive, a flash drive, or the like. Storage interface 830 generally represents any type or form of interface or device for transferring data between storage devices 832 and 834 and other components of computing system 800.

In certain embodiments, storage devices 832 and 834 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 832 and 834 may also include other similar structures or devices for allowing computer software, data, or other computer-readable instructions to be loaded into computing system 800. For example, storage devices 832 and 834 may be configured to read and write software, data, or other computer-readable information. Storage devices 832 and 834 may be a part of computing system 800 or may be separate devices accessed through other interface systems.

Many other devices or subsystems may be connected to computing system 800. Conversely, all of the components and devices illustrated in FIG. 8 need not be present to practice the embodiments described and/or illustrated herein. The devices and subsystems referenced above may also be interconnected in different ways from those shown in FIG. 8. Computing system 800 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives and floppy disks), optical-storage media (e.g., Compact Disks (CDs) and Digital Video Disks (DVDs)), electronic-storage media (e.g., solid-state drives and flash media), and other distribution systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of apparatus 100 in FIG. 1 may represent portions of a cloud-computing or network-based environment. Cloud-computing and network-based environments may provide various services and applications via the Internet. These cloud-computing and network-based services (e.g., software as a service, platform as a service, infrastructure as a service, etc.) may be accessible through a web browser or other remote interface. Various functions described herein may also provide network switching capabilities, gateway access capabilities, network security functions, content caching and delivery services for a network, network control services, and/or and other networking functionality.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. An apparatus comprising:
   at least one storage device that facilitates storing a hierarchical bitmap tree that comprises:
      a root node that includes:
         a root index; and
         a set of lookup indexes that each correspond to a bit included in the root index; and
      a set of leaf nodes that each correspond to a bit included in one of the set of lookup indexes within the root node, wherein each of the set of leaf nodes includes:
         a leaf index; and
         a set of objects that each correspond to a bit included in the leaf index;
   at least one processing unit that is communicatively coupled to the storage device, wherein the processing unit manages memory in connection with a computing device by:
      searching through the root index of the root node until encountering the first bit indicating that one of the set of lookup indexes corresponds to a leaf node that references an unallocated memory location;
      finding, during the search of the root index, the first bit indicating that one of the set of lookup indexes corresponds to a leaf node that references an unallocated memory location; and
      in response to finding the first bit indicating that one of the set of lookup indexes corresponds to a leaf node that references an unallocated memory location:
         terminating the search of the root index; and
         traversing from the root index to the one of the set of lookup indexes indicated by the first bit;
      identifying, within the one of the set of lookup indexes, a bit indicating that one of the set of leaf nodes references the unallocated memory location;
      searching the leaf index of the one of the set of leaf nodes for a bit indicating that one of the set of objects within the one of the set of leaf nodes corresponds to the unallocated memory location;
      identifying, within the one of the set of objects, a bit that corresponds to a specific memory location and indicates that the specific memory location is currently unallocated; and
      allocating the specific memory location for use by the computing device.

2. The apparatus of claim 1, wherein the processing unit:
   searches through the one of the set of lookup indexes until encountering the first bit indicating that one of the set of leaf nodes references an unallocated memory location;
   finds, during the search of the one of the set of lookup indexes, the first bit indicating that one of the set of leaf nodes references an unallocated memory location; and in response to finding the first bit indicating one of the set of leaf nodes references an unallocated memory location:
   terminates the search of the one of the set of lookup indexes; and
   traverses from the one of the set of lookup indexes to the one of the leaf nodes indicated by the first bit.

3. The apparatus of claim 1, wherein the processing unit:
   searches through the leaf index of the one of the leaf nodes until encountering the first bit indicating that one of the set of objects within the one of the set of leaf nodes corresponds to an unallocated memory location;
   finds, during the search of the leaf index, the first bit indicating that one of the set of objects within the one of the set of leaf nodes corresponds to an unallocated memory location; and
   in response to finding the first bit indicating that one of the set of objects within the one of the set of leaf nodes corresponds to an unallocated memory location:
      terminates the search of the leaf index; and
      traverses from the leaf index to the one of the set of objects indicated by the first bit.

4. The apparatus of claim 1, wherein the processing unit:
   searches through the one of the set of objects until encountering the first bit that indicates an unallocated memory location;
   finds, during the search of the one of the set of objects, the first bit that indicates an unallocated memory location; and
   in response to finding the first bit that indicates an unallocated memory location:
      terminates the search of the one of the set of objects; and
      allocates the unallocated memory location for use by the computing device.

5. The apparatus of claim 1, wherein:
   the root index comprises a set of bits that each correspond to a different one of the set of lookup indexes;
   each lookup index comprises a set of bits that each correspond to a different one of the set of leaf nodes;
   each leaf index comprises a set of bits that each correspond to a different one of the set of objects; and
   each object comprises a set of bits that each correspond to a different memory location.

6. The apparatus of claim 1, wherein:
   the root node comprises a tree structure that includes:
      the root index represents a parent node; and
      the set of lookup indexes each represent a child node;
   each leaf node comprises a tree structure that includes:
      a leaf index that represents a parent node; and
      a set of objects that each represent a child node.

7. The apparatus of claim 1, wherein the processing unit:
   deallocates a memory location to free up space for use by the computing device;
   identifies, within an object of a leaf node, an object bit that references the memory location;
   configures the object bit to indicate that the memory location is unallocated;
   identifies, within a root index of the leaf node to which the object is assigned, an index bit that corresponds to the object that includes the object bit;
   configures the index bit to indicate that the object references an unallocated memory location;
   identifies, within a lookup index to which the leaf node is assigned, another index bit that corresponds to the leaf node that includes the object;
   configures the other index bit to indicate that the leaf node includes an object that references an unallocated memory location;
   identifies, within the root index of the root node, a further index bit that corresponds to the lookup index to which the leaf node is assigned; and
   configures the further index bit to indicate that the lookup index leads to an object that references an unallocated memory location.

8. The apparatus of claim 1, wherein the processing unit implements a fixed-size block allocator to manage memory in connection with the computing device.

9. The apparatus of claim 1, wherein the memory managed by the processing unit comprises a slow counter that tracks performance of at least one component of the computing device.

10. The apparatus of claim 1, wherein the memory managed by the processing unit comprises a routing table that stores routes that define paths to other computing devices within a network.

11. A router comprising:
   at least one storage device that facilitates storing a hierarchical bitmap tree that comprises:
      a root node that includes:
         a root index; and
         a set of lookup indexes that each correspond to a bit included in the root index; and
      a set of leaf nodes that each correspond to a bit included in one of the set of lookup indexes within the root node, wherein each of the set of leaf nodes includes:
         a leaf index; and
         a set of objects that each correspond to a bit included in the leaf index;
   at least one physical processor that is communicatively coupled to the storage device, wherein the physical processor manages memory in connection with the router by:
      searching through the root index of the root node until encountering the first bit indicating that one of the set of lookup indexes corresponds to a leaf node that references an unallocated memory location;
      finding, during the search of the root index, the first bit indicating that one of the set of lookup indexes corresponds to a leaf node that references an unallocated memory location; and
      in response to finding the first bit indicating that one of the set of lookup indexes corresponds to a leaf node that references an unallocated memory location:
         terminating the search of the root index; and
         traversing from the root index to the one of the set of lookup indexes indicated by the first bit;
      identifying, within the one of the set of lookup indexes, a bit indicating that one of the set of leaf nodes references the unallocated memory location;
      searching the leaf index of the one of the set of leaf nodes for a bit indicating that one of the set of objects within the one of the set of leaf nodes corresponds to the unallocated memory location;
      identifying, within the one of the set of objects, a bit that corresponds to a specific memory location and indicates that the specific memory location is currently unallocated; and
      allocating the specific memory location for use by the router.

12. The router of claim 11, wherein the physical processor:

searches through the one of the set of lookup indexes until encountering the first bit indicating that one of the set of leaf nodes references an unallocated memory location;

finds, during the search of the one of the set of lookup indexes, the first bit indicating that one of the set of leaf nodes references an unallocated memory location; and in response to finding the first bit indicating one of the set of leaf nodes references an unallocated memory location:
   terminates the search of the one of the set of lookup indexes; and
   traverses from the one of the set of lookup indexes to the one of the leaf nodes indicated by the first bit.

13. The router of claim 11, wherein the physical processor:
   searches through the leaf index of the one of the leaf nodes until encountering the first bit indicating that one of the set of objects within the one of the set of leaf nodes corresponds to an unallocated memory location;
   finds, during the search of the leaf index, the first bit indicating that one of the set of objects within the one of the set of leaf nodes corresponds to an unallocated memory location; and
   in response to finding the first bit indicating that one of the set of objects within the one of the set of leaf nodes corresponds to an unallocated memory location:
      terminates the search of the leaf index; and
      traverses from the leaf index to the one of the set of objects indicated by the first bit.

14. The router of claim 11, wherein the physical processor:
   searches through the one of the set of objects until encountering the first bit that indicates an unallocated memory location;
   finds, during the search of the one of the set of objects, the first bit that indicates an unallocated memory location; and
   in response to finding the first bit that indicates an unallocated memory location:
      terminates the search of the one of the set of objects; and
      allocates the unallocated memory location for use by the router.

15. The router of claim 11, wherein:
   the root index comprises a set of bits that each correspond to a different one of the set of lookup indexes;
   each lookup index comprises a set of bits that each correspond to a different one of the set of leaf nodes;
   each leaf index comprises a set of bits that each correspond to a different one of the set of objects; and
   each object comprises a set of bits that each correspond to a different memory location.

16. The router of claim 11, wherein:
   the root node comprises a tree structure that includes:
      the root index represents a parent node; and
      the set of lookup indexes each represent a child node;
   each leaf node comprises a tree structure that includes:
      a leaf index that represents a parent node; and
      a set of objects that each represent a child node.

17. The router of claim 11, wherein the physical processor:
   deallocates a memory location to free up space for use by the router;
   identifies, within an object of a leaf node, an object bit that references the memory location;
   configures the object bit to indicate that the memory location is unallocated;
   identifies, within a root index of the leaf node to which the object is assigned, an index bit that corresponds to the object that includes the object bit;
   configures the index bit to indicate that the object references an unallocated memory location;
   identifies, within a lookup index to which the leaf node is assigned, another index bit that corresponds to the leaf node that includes the object;
   configures the other index bit to indicate that the leaf node includes an object that references an unallocated memory location;
   identifies, within the root index of the root node, a further index bit that corresponds to the lookup index to which the leaf node is assigned; and
   configures the further index bit to indicate that the lookup index leads to an object that references an unallocated memory location.

18. A method comprising:
   searching through a root index of a root node until encountering the first bit indicating that a specific lookup index within a set of lookup indexes leads to an object that references an unallocated memory location;
   finding, during the search of the root index, the first bit indicating that a specific lookup index within a set of lookup indexes leads to an object that references an unallocated memory location; and
   in response to finding the first bit indicating that a specific lookup index within a set of lookup indexes leads to an object that references an unallocated memory location:
      terminating the search of the root index; and
      traversing from the root index to the specific lookup index indicated by the first bit;
   identifying, within the specific lookup index, a bit indicating that a specific leaf node within a set of leaf nodes leads to the object that references the unallocated memory location;
   searching a leaf index of the specific leaf node for a bit indicating that a specific object within a set of objects references the unallocated memory location;
   identifying, within the specific object, a bit that corresponds to a specific memory location and indicates that the specific memory location is currently unallocated; and
   allocating the specific memory location for use by a computing device.

* * * * *